United States Patent
Calvo et al.

(10) Patent No.: US 12,038,605 B2
(45) Date of Patent: Jul. 16, 2024

(54) WAVE GUIDE SENSOR

(71) Applicants: STMicroelectronics (Crolles 2) SAS, Crolles (FR); Institut National des Sciences Appliquees de Lyon, Villeurbanne (FR); Universite Claude Bernard Lyon 1, Villeurbanne (FR); Centre National de la Recherche Scientifique, Paris (FR)

(72) Inventors: Michele Calvo, Lyons (FR); Stephane Monfray, Eybens (FR); Paul Charette, Sherbrooke (CA); Guillaume Beaudin, Sherbrooke (CA); Regis Orobtchouk, Les Abrets en Dauphiné (FR)

(73) Assignees: UNIVERSITE CLAUDE BERNARD LYON 1, Villeurbanne (FR); CENTRE NATIONAL DE LA RECHERCHE SCIENTIFIQUE, Paris (FR); INSTITUT NATIONAL DES SCIENCES APPLIQUEES DE LYON, Villeurbanne (FR); STMicroelectronics (Crolles 2) SAS, Crolles (FR)

( * ) Notice: Subject to any disclaimer, the term of this patent is extended or adjusted under 35 U.S.C. 154(b) by 216 days.

(21) Appl. No.: 17/513,575

(22) Filed: Oct. 28, 2021

(65) Prior Publication Data

US 2022/0050246 A1 Feb. 17, 2022

Related U.S. Application Data

(63) Continuation of application No. PCT/FR2019/050998, filed on Apr. 29, 2019.

(51) Int. Cl.
*G02B 6/122* (2006.01)
*G01N 15/06* (2024.01)
(Continued)

(52) U.S. Cl.
CPC .......... *G02B 6/1226* (2013.01); *G01N 15/06* (2013.01); *G02B 6/13* (2013.01); *G01N 15/075* (2024.01); *G02B 2006/12138* (2013.01)

(58) Field of Classification Search
None
See application file for complete search history.

(56) References Cited

U.S. PATENT DOCUMENTS

2021/0364510 A1* 11/2021 Lin .................. G02B 6/12019
2022/0050246 A1* 2/2022 Calvo ................. G02B 6/1226

OTHER PUBLICATIONS

Bian, Yusheng, et al., "Highly confined guiding of low-loss plasmon waves in hybrid metal-dielectric slot waveguides", IOP Publishing, published in Nanotechnology, vol. 25, Aug. 5, 2014, 11 pages.
(Continued)

*Primary Examiner* — Rhonda S Peace
(74) *Attorney, Agent, or Firm* — Slater Matsil, LLP

(57) ABSTRACT

An embodiment sensor includes a hybrid waveguide. The hybrid waveguide includes a first dielectric optical waveguide lying on and in contact with a dielectric support layer; a first surface waveguide optically coupled to the first dielectric optical waveguide, parallel to the first dielectric optical waveguide, and lying on the dielectric support layer. The first surface waveguide has a lateral surface configured to guide a surface mode. The hybrid waveguide includes a cavity intended to be filled with a dielectric fluid, separating laterally the first dielectric optical waveguide from the lateral surface of the first surface waveguide.

20 Claims, 10 Drawing Sheets

(51) Int. Cl.
    *G02B 6/12*     (2006.01)
    *G02B 6/13*     (2006.01)
    *G01N 15/075*     (2024.01)

(56) References Cited

OTHER PUBLICATIONS

Chen, Chen, et al., "Protein analysis by Mach-Zehnder interferometers with a hybrid plasmonic waveguide with hano-slots", Optics Express, vol. 25, No. 25, Dec. 11, 2017, 15 pages.

Liang, Yao, et al., "Optical performance of long-range air-gaps assisted subwavelength waveguides", published in Optical Engineering, vol. 53, Issue 8, Aug. 8, 2014, 8 pages.

Osowiecki, Gael, et al., "Localized biomolecular sensing enable through plasmonic nanocavities", Biophotonics: Photonic Solutions for Better Health Care IV, vol. 9129, May 2014, 8 pages.

Sun, Xu, et al., "High-sensitivity liquid refractive-index sensor based on a Mach-Zehnder interferometer with a double-slot hybrd plasmonic waveguide", published in Optics Express, vol. 23, Issue 20, Sep. 22, 2015, 12 pages.

\* cited by examiner

A

B

A

B

A

B

A

B

WAVE GUIDE SENSOR

CROSS-REFERENCE TO RELATED APPLICATIONS

This application is a Continuation Application of International Application No. PCT/FR2019/050998, filed on Apr. 29, 2019, which application is hereby incorporated herein by reference.

TECHNICAL FIELD

The present disclosure relates generally to the field of (optical or optoelectronic) photonic circuits, and more specifically to a sensor comprising a waveguide.

BACKGROUND

In a waveguide sensor, a waveguide of the sensor is used to determine whether or not a molecule or a particle to be detected is present in the proximity of the waveguide, in a dielectric fluid (liquid or gas) in contact with the waveguide. Indeed, when an optical mode of a signal propagates in the waveguide, its effective optical index, or effective refractive index, is modified if a molecule to be detected is disposed sufficiently close to the waveguide, for example in contact with the waveguide.

This variation in effective optical index modifies the propagation of the optical mode. By observing the propagation of this optical mode, or at least values representative of this propagation, it is thus possible to determine whether or not the molecule or particle to be detected is present in the dielectric fluid, or even to determine a concentration of this molecule or particle in the dielectric fluid.

SUMMARY

One embodiment provides a sensor comprising a hybrid waveguide comprising, on a dielectric support layer: a first dielectric optical waveguide lying on and in contact with the support layer; for one or each longitudinal lateral face of the first waveguide, a second surface waveguide optically coupled to the first waveguide, parallel to the first waveguide, lying on the support layer, and comprising a surface configured to guide a surface mode; and a cavity intended to be filled with a dielectric fluid, separating laterally the first waveguide from said surface of the/each second waveguide.

According to an embodiment, said second waveguide is a plasmonic waveguide, said surface of the second waveguide being metal and being configured to propagate the surface plasmons.

According to an embodiment, the hybrid waveguide is configured to guide an optical mode of an optical signal when said fluid fills said cavity, and potentially covers the first waveguide and the one or more second waveguides.

According to an embodiment, the effective optical index of said mode in the hybrid waveguide is greater than the refractive index of the fluid and than the effective optical index of said mode in the first waveguide on its own.

According to an embodiment, said mode is a radiated mode of the first waveguide, preferably predominantly from the longitudinal lateral faces of the first waveguide.

According to an embodiment, the first waveguide comprises a dielectric or semiconducting strip a lower face of which lies on and in contact with an upper face of said support layer and longitudinal lateral faces of which constitute said longitudinal lateral faces of the first waveguide.

According to an embodiment, a dimension of said cavity between said longitudinal lateral face of the first waveguide and said surface of the second waveguide is less than an operating wavelength of the sensor.

According to an embodiment, a dimension of said cavity between said longitudinal lateral face of the first waveguide and said surface of the second waveguide is determined by simulation.

According to an embodiment, the width of the cavity extends from said longitudinal lateral face of the first waveguide up to said surface of the second waveguide, said surface of the second waveguide being parallel to said longitudinal lateral face.

According to an embodiment, the sensor comprises a resonant annular waveguide constituted entirely or partly by the hybrid waveguide defined above.

According to an embodiment, the sensor comprises an interferometer of the Mach-Zehnder type constituted entirely or partly by the hybrid waveguide defined above.

According to an embodiment, faces of the first waveguide intended to be in contact with said fluid and/or faces of the second waveguide intended to be in contact with said fluid are functionalized as a function of a molecule or a particle to be detected in said fluid.

According to an embodiment, the sensor is adapted to detect, in said fluid, a molecule or a particle of a size of up to 5 μm.

A further embodiment provides a method for manufacturing a sensor comprising a hybrid waveguide comprising, on a dielectric support layer: a first dielectric optical waveguide lying on and in contact with the support layer; for one or each longitudinal lateral face of the first waveguide, a second surface waveguide optically coupled to the first waveguide, parallel to the first waveguide, lying on the support layer, and comprising a surface configured to guide a surface mode; and a cavity intended to be filled with a dielectric fluid, separating laterally the first waveguide from said surface of the/each second waveguide, the method comprising the following successive steps: a) determining, by simulation of a device without a second waveguide and comprising the first waveguide lying on the support layer 106 and being surrounded by said fluid, dimensions of a transverse section of the first waveguide such that, for an optical mode of a signal propagating in the first waveguide, the effective optical index of said mode is lower than the refractive index of said fluid; b) determining, by simulation of the sensor in which the transverse section of the first waveguide has the dimensions determined in step a), a position of the/each second waveguide with respect to the first waveguide so that the effective optical index of said mode in the hybrid waveguide is greater than the refractive index of the fluid; and c) manufacturing the sensor with the dimensions determined in step a) and the position determined in step b).

According to an embodiment, the sensor defined above is obtained according to the method defined above.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Figure 1:
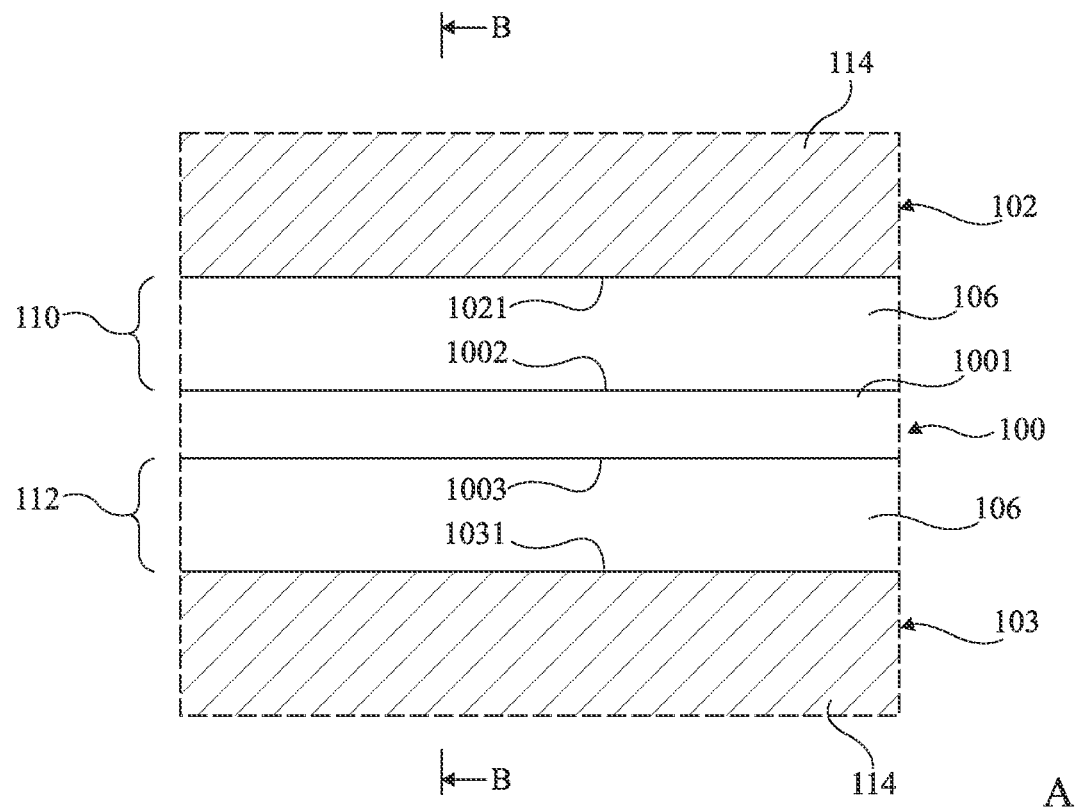
FIG. 1 illustrates, in a schematic fashion, respective top and sectional views A and B of an embodiment of a waveguide sensor.
Figure 1:
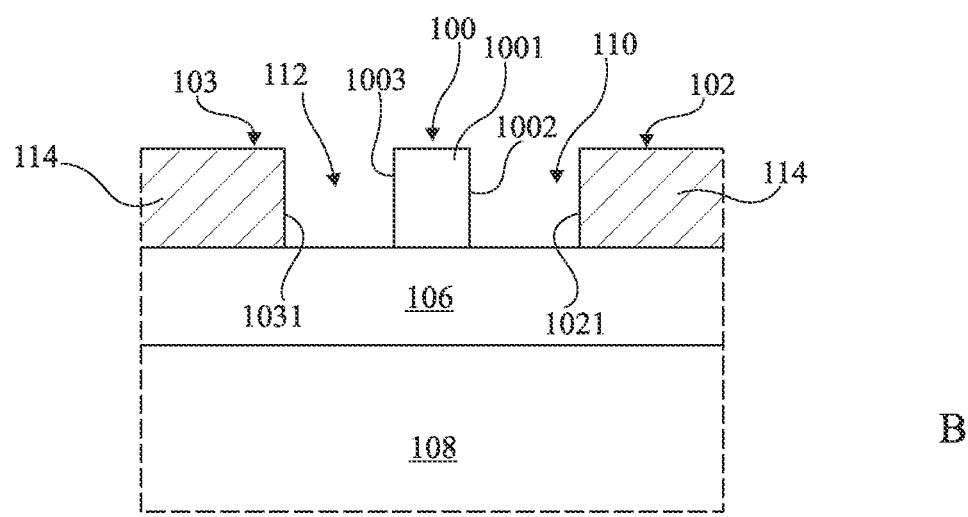

Like features have been designated by like references in the various figures. In particular, the structural and/or functional features that are common among the various embodiments may have the same references and may have identical structural, dimensional and material properties.

For the sake of clarity, only the operations and elements that are useful for an understanding of the described embodiments herein have been illustrated and described in detail.

Unless indicated otherwise, when reference is made to two elements that are connected together, this means a direct connection without any intermediate elements other than conductors, and when reference is made to two elements that are coupled together, this means that these two elements can be connected or coupled by way of one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Embodiments of this disclosure describe at least partial improvement of certain aspects of waveguide sensors.

One embodiment addresses all or some of the drawbacks of the known waveguide sensors.

A waveguide sensor is proposed here in which the waveguide used for detecting a molecule or a particle in a dielectric fluid is a hybrid waveguide. As will be seen in greater detail below, the hybrid waveguide here is an optical/plasmonic hybrid waveguide comprising an optical waveguide, i.e. a waveguide the core of which is intended to propagate an optical signal, one or two plasmonic waveguides optically coupled with the optical waveguide, and, between the optical waveguide and each plasmonic waveguide, a cavity separating the waveguides and being intended to be filled with the fluid. More specifically, the optical waveguide is a dielectric optical waveguide, i.e. is constituted by dielectric materials. Moreover, the dielectric optical waveguide is configured so that it propagates either a radiated mode, i.e. a mode that is not confined in the core of the dielectric optical waveguide as the effective optical index of this mode in the core of the dielectric optical waveguide is lower than the refractive index of the dielectric fluid that surrounds it. This optical mode thus radiates up to the plasmonic waveguide in order to create there a delocalised plasmonic surface mode or plasmon-polariton, i.e. surface plasmons. The hybrid waveguide is configured in order that the radiated optical mode of the dielectric optical waveguide and the plasmonic mode of the one or more plasmonic waveguides are coupled together, thus creating an optical mode, or supermode, guided and confined in the hybrid waveguide as the effective optical index of the optical supermode in the hybrid waveguide is greater than the refractive index of the dielectric fluid that surrounds it.

An advantage of such a sensor is that the losses by propagation in the hybrid waveguide are lower than in a purely plasmonic waveguide.

An advantage of such a sensor is that the sensitive surface of the sensor, which corresponds to a metal surface of the plasmonic waveguide, is easy to functionalize. In particular, this metal surface can be functionalized in a specific manner, i.e. it is possible to choose selectively molecules for functionalization that will be on this metal surface and/or potentially molecules for functionalization that will be on one or more dielectric materials.

An advantage of such a sensor is that the cavity separating the dielectric optical waveguide from a plasmonic waveguide has dimensions greater than those of a cavity separating two optical waveguides coupled by evanescent-wave coupling ("slot waveguides"). Thus, the size of the molecules or particles that can be detected with the help of the sensor proposed here is greater than that of the molecules or particles that can be detected in a sensor where the molecule or the particle should be located in a cavity separating two dielectric optical waveguides coupled with each other by evanescent-wave coupling in order to be detected.

An advantage of such a sensor is that it is compact and that its manufacture is compatible with the techniques and the steps used in the manufacture of photonic integrated circuits.

An advantage of such a sensor is that it is more sensitive than a sensor comprising only dielectric optical waveguides, i.e. comprising no plasmonic waveguides.

In the following description, as an example, the case of an optical/plasmonic hybrid waveguide sensor is considered in which the optical signal used to detect a molecule in a dielectric fluid has a wavelength comprised in the near infrared, i.e. between 780 nm and 3 µm, for example substantially equal to 1.31 µm or 1.55 µm, preferably equal or substantially equal to 1.31 µm.

FIG. 1 illustrates, in a schematic fashion, respective top and sectional views A and B of an embodiment of an optical/plasmonic hybrid waveguide sensor, the view B being a sectional view along the plane BB indicated in the view A.

The sensor comprises a dielectric optical waveguide wo and two identical plasmonic waveguides 102 and 103. The waveguides 100, 102 and 103 form the optical/plasmonic hybrid waveguide of the sensor. The waveguides 100, 102 and 103 lie on a dielectric support layer 106, for example made of silicon oxide. In the example shown in FIG. 1, the layer 106 lies on and in contact with a substrate 108, for example made of silicon.

The waveguides 100, 102 and 103 are parallel in the direction of their length. More specifically, a first lateral face 1002 of the waveguide 100, here parallel to the longitudinal direction of the waveguide 100, is across from and parallel to a face 1021 of the waveguide 102 (at the top in view A and on the right in view B). The other lateral face 1003 of the waveguide 100, likewise parallel to the longitudinal direction of the waveguide 100, is across from and parallel to a face 1031 of the waveguide 103 (at the bottom in view A and on the left in view B). The faces 1021 and 1031 correspond to the surfaces of the waveguides 102 and 103 where the plasmonic modes will be localised.

A cavity, or trench, 110 extends widthways from the waveguide 100 up to the waveguide 102, and more specifically from the face 1002 up to the face 1021. A cavity, or trench, 112 extends widthways from the waveguide 100 up to the waveguide 103, and more specifically from the face 1003 up to the face 1031. The cavities 110 and 112 have substantially identical, preferably identical, dimensions. Preferably, the bottom of the cavities 110 and 112 is at the same level as the upper face of the support layer 106, or, in other words, portions of the upper face of the layer 106 constitute the bottoms of the cavities 110 and 112.

The optical waveguide 100 comprises a strip 1001 made of a dielectric material, for example silicon nitride, or of a semiconducting material, for example silicon. Preferably, the lower face of the strip 1001 lies on and in contact with the upper face of the layer 106. The strip 1001 has, for example, a rectangular cross section. The lateral faces of the strip 1001 parallel to the longitudinal direction of the strip 1001, i.e. the longitudinal lateral faces of the strip 1001, correspond to the respective faces 1002 and 1003.

The waveguide 102, respectively 103, comprises a metal layer 114, or, more precisely, a portion of the layer 114. Preferably, the metal layer 114 lies on and in contact with the upper face of the layer 106. The thickness of the layer 114 is measured here in a direction orthogonal to the upper face of the layer 106. In this embodiment, the faces 1021 and 1031 correspond to lateral faces of the layer 114. Preferably, the thickness of the layer 114 is equal to the height of the waveguide 100, i.e. to the height of the strip 1001 in this example, the height of the waveguide 100 being measured here in a direction orthogonal to the upper face of the layer 106. For instance, the layer 114 is a layer of gold, of titanium, of tantalum, of copper, of silver, of aluminum, of tungsten or of an alloy of more than one of these metals. Preferably, the layer 114 is made of gold, in particular due to the biocompatible character of gold.

As a variant, the layer 114 can be made of a material comprising one or more metals, for example one or more of the metals listed above as an example, this material, for example titanium nitride or tantalum nitride, having the behavior of a metal.

During operation, the sensor is placed in the presence of the dielectric fluid in which it is desired to detect the presence of a given molecule or particle, or to detect a concentration of this molecule or particle in the fluid. The dielectric fluid (not illustrated in FIG. 1) thus fills the cavities 110 and 112. Preferably, the fluid covers the sensor, and more specifically the waveguides 100, 102 and 103, i.e. the fluid also covers the upper face of the layer 114 and the upper face of the strip 1001.

An optical signal at the operating wavelength of the hybrid waveguide is thus provided to the waveguide 100, for example at one end of the waveguide 100 or along a portion of the waveguide 100, for example by evanescent-wave coupling, or near-field coupling. The dimensions of the cross section of the waveguide 100 are chosen in order that an optical mode of the signal propagating in the waveguide 100 corresponds to a radiated optical mode of the waveguide 100, and, more specifically, an optical mode radiating predominantly via the faces 1002 and 1003 of the waveguide 100. The width of the cavity 110, respectively 112, is chosen so that the radiated optical mode reaches the face 1021 of the waveguide 102, respectively the face 1031 of the waveguide 103, in order to generate plasmons-polaritons there. The coupling of the plasmonic mode with the radiated optical mode results in an optical supermode that propagates, in a confined manner, in the hybrid waveguide. Preferably, in a plane orthogonal to the longitudinal direction of the waveguide 100, the power of the supermode is predominantly comprised in the cavities 110 and 112.

For instance, the width of the cavities 110 and 112 is such that, in a plane orthogonal to the longitudinal direction of the waveguide 100, the power of the radiated optical mode outside the waveguide 100 and measured at the face 1021 or 1031, is greater than or equal to 1%, preferably greater than or equal to 10%, of the total optical power of this mode in the plane in question. For instance, the width of the cavities 110 and 112 is less than the operating wavelength of the sensor.

When a molecule or a particle to be detected is present in one of the cavities 110 or 112, this causes a change in the effective optical index of the supermode. By observing one or more variables representative of the propagation of the supermode in the hybrid waveguide, it is possible to detect when the propagation of the supermode in the hybrid waveguide changes, thus when at least one molecule or one particle to be detected is present in one of the cavities 102 and 103. When the observed variable varies in a proportional or substantially proportional manner, preferably in a linear manner, with the concentration in molecules or in particles to be detected in the fluid, it is further possible to determine the concentration of the molecule to be detected in the fluid. More generally, when the relation between the variation in effective optical index of the supermode in the hybrid waveguide and the concentration of the molecule or particle to be detected in the dielectric fluid are known, for example following a step of calibrating the sensor, it is possible to determine, for example by observing a variation in the optical power of the supermode during its propagation in the hybrid waveguide, the concentration of this molecule or particle in the dielectric fluid.

Figure 2:
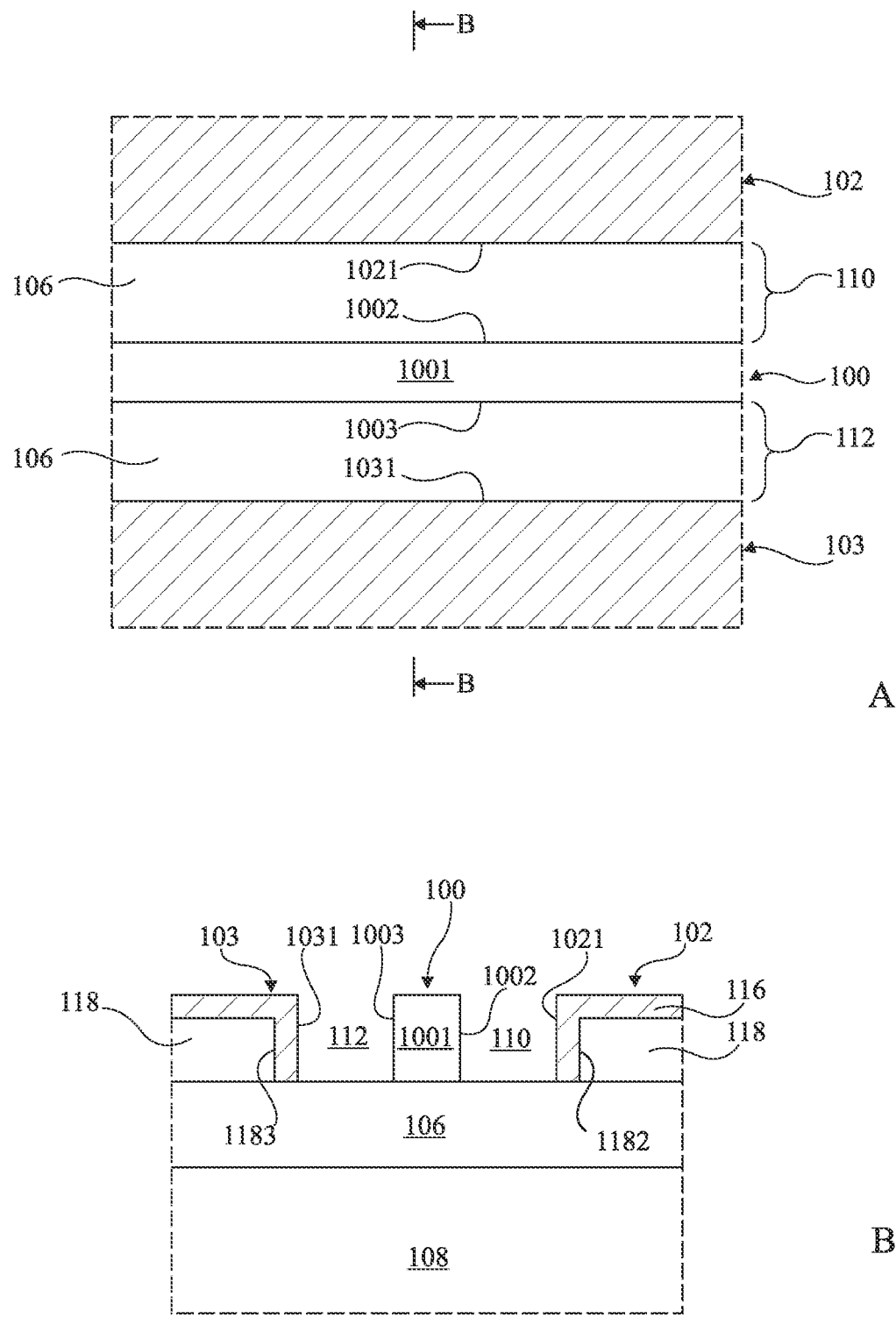
FIG. 2 illustrates, in a schematic fashion, respective top and sectional views A and B of a further embodiment of a waveguide sensor.

FIG. 2 illustrates, in a schematic fashion, respective top and sectional views A and B of a further embodiment of a waveguide sensor, the view B being a sectional view along the plane BB indicated in the view A.

The sensor shown in FIG. 2 differs from the sensor of FIG. 1 by the structure of the plasmonic waveguides guides 102 and 103 that it comprises. Indeed, in the sensor of FIG. 1, the waveguides 102 and 103 comprise a thick metal layer 114 and the faces 1021 and 1031 of the respective guides 102 and 103 are lateral faces of the layer 114. In the sensor of FIG. 2, the waveguides 102 and 103 comprise a thin metal layer 116 covering lateral faces 1182 and 1183 of a layer 118, or, as is the case in the example shown in FIG. 2, the upper face of the layer 118. The layer 118 is, for example, a dielectric or metal layer. The faces 1182 and 1183 of the layer 118 are parallel and across from respective faces 1002 and 1003 of the waveguide 100. Thus, the vertical portion of the layer 116 disposed on and in contact with the face 1182, respectively 1183, of the layer 118 comprises a face 1021, respectively 1031, parallel and opposite the face 1002, respectively 1003. The thickness of the vertical portions of the layer 116 across from the faces 1002 and 1003 of the waveguide 100, measured here in a direction orthogonal to the faces 1002 and 1003, is, for example, greater than or equal to, preferably greater than, the skin depth, at the operating wavelength of the sensor, of the material that constitutes the layer 116.

The layer 116 is, for example, made of the same material as the layer 114 described in relation to FIG. 2.

The operation of the sensor shown in FIG. 2 is identical to the operation of the sensor shown in FIG. 2.

As the layer 116 of the sensor shown in FIG. 2 is less thick than the layer 114 of the sensor shown in FIG. 1, the sensor of FIG. 2 is less costly to manufacture than the sensor of FIG. 1 when the material that constitutes these layers is an expensive material such as gold.

Figure 3:
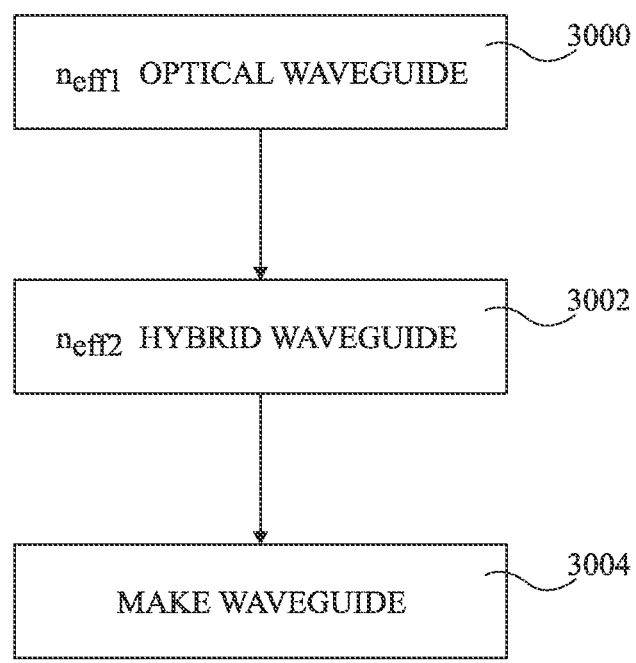
FIG. 3 illustrates, in the form of blocks, an embodiment of a method for manufacturing a waveguide sensor of the type shown in FIG. 1 or 2.

FIG. 3 illustrates, in the form of blocks, an embodiment of a method for manufacturing a waveguide sensor of the type shown in FIG. 1 or 2.

In a step 3000 (block "$n_{eff1}$ OPTICAL WAVEGUIDE"), the dimensions of the waveguide 100, and more specifically the dimensions of the cross section of the strip 1001 of the waveguide 100, are determined. For this purpose, the behaviour of an imaginary device corresponding to the sensor shown in FIG. 1 or 2 in which the plasmonic waveguides 102 and 103 are removed is simulated. In other words, this imaginary device corresponds to the sensor of FIG. 1 in which the layer 114 is omitted, or to the sensor of FIG. 2 in which the layers 116 and 118 are omitted. The dielectric fluid is further considered to cover the imaginary device, up to a level at least equal to, preferably higher than, the level of the upper face of the waveguide 100, i.e. the level of the upper face of the strip 1001. The effective optical index $n_{eff1}$ of a given optical mode intended to be the radiated mode of the waveguide 100 is thus calculated, in particular based on the refractive index of the fluid, on the refractive index of the material of the layer 106, on the refractive index of the material of the strip 1001 and on the dimensions of the cross section of the waveguide 100, thus of the strip 1001. This calculation of the index $n_{eff1}$ is performed by modifying the dimensions of the cross section. Dimensions of the cross section of the waveguide 100 corresponding to an index $n_{eff1}$ calculated to be less than the refractive index of the dielectric fluid are thus selected. For the selected dimensions, the optical mode in question is thus a radiated mode of the waveguide 100, in the dielectric fluid.

For instance, step 3000 consists in determining, for the optical mode of interest, the minimum cross section of the strip 1001 for which this optical mode is confined, i.e. the index $n_{eff1}$ of this mode is higher than the refractive index of the fluid and than the refractive index of the material of the layer 106. At least one of the dimensions (height, width) of this minimum cross section, preferably a sole dimension, and even more preferably, the width measured in a direction orthogonal to the faces 1002 and 1003, is thus reduced, for example by less than 10%, preferably by less than 5%. Thus, for this cross section of a reduced size, the index $n_{eff1}$ of the optical mode in question is lower than the refractive index of the dielectric fluid, with the result that this optical mode is a radiated mode of the waveguide 100.

In a following step 3002 (block "$n_{eff2}$ HYBRID WAVEGUIDE"), the effective optical index $n_{eff2}$ of the optical mode considered in step 3000 is calculated for the hybrid waveguide of the sensor shown in FIG. 1 or 2, by simulating the behaviour of this sensor. In this step, the dimensions of the cross section of the waveguide 100 are those determined in step 3000 in order for the optical mode to be a radiated mode of the waveguide 100. Moreover, in this step 3002, the fluid is considered to cover the sensor in the same manner as in step 3000. The calculation of the index $n_{eff2}$ is performed for a plurality of positions of the plasmonic waveguides 102 and 103 with respect to the optical waveguide 100, i.e. for a plurality of widths of the cavities 110 and 112. A width of the cavities 110 and 112 is thus selected so that the index $n_{eff2}$ of the mode in question, for this width, is greater than the refractive index of the fluid and of the material of the layer 106. In other words, for the selected width, the optical mode in question radiates from the optical waveguide 100 up to the faces 1021 and 1031 of the plasmonic waveguides 102 and 103 where it transforms into a supermode guided in the hybrid waveguide. Preferably, the selected width is further determined by the size of a molecule or particle to be detected, so that this molecule or particle can be accommodated in a cavity 110 or 112, and/or by the distribution, in a plane orthogonal to the longitudinal direction of the waveguide 100, of the optical power of the optical mode, so that the bulk of the optical power of the mode is in the cavities 110 and 112.

Depending on the constraints (size of the molecule or particle to be detected, distribution of the power of the supermode in the hybrid waveguide, etc.) considered in step 3002, more than one iteration of step 3000 then of step 3002 can be implemented in order to obtain a configuration (dimensions of the cross section of the optical waveguide, width of the cavity, etc.) of the hybrid waveguide that satisfies these constraints.

In a following step 3004 (block "MAKE WAVEGUIDE"), a sensor in which the cross section of the waveguide 100 has the dimensions determined in step 3000 and in which the width of the cavities 110 and 112 is that determined in step 3002, is manufactured.

Preferably, the calculation, for given dimensions and materials, of the effective indexes in the respective steps 3000 and 3002 is implemented by computer, for example by means of tools (software or programmes) known as mode solvers. These tools can be tools developed by a person skilled in the art implementing the method of FIG. 3. These tools can also be commercially available tools, for example the tool known under the trade name FimmWave. By means of these tools, it is possible to implement the simulation of the device of step 3000 and the simulation of the sensor of step 3002.

For instance, a sensor of the type shown in FIG. 1 or 2 is considered in which the layer 114 or 116 is made of gold, the layer 106 is made of silicon oxide, the fluid intended to fill the cavities is water and the material of the strip 1001 is silicon nitride. In this example sensor, the optical mode propagated by the waveguide 100 is further considered to be the fundamental transverse electric mode (TE) of a signal having a wavelength equal to 1.31 µm. In this example sensor, the implementation of the steps 3000 and 3002 leads to a sensor having the following dimensions:

between 300 and 350 nm, preferably equal to 300 nm for the width of the cross section of the strip 1001;

between 550 and 650 nm, preferably equal to 600 nm for the height of the cross section of the strip 1001; and between 30 and 1000 nm, for example equal to 600 nm for the width of the cavities 110 and 112, the cavities 110 and 112 extending in a depth direction from a level equal to the level of the upper face of the strip 1001 until a level equal to the level of the upper face of the layer 106.

More than one embodiment of the step 3004 will now be described in relation to FIGS. 4, 5, 6 and 7. It should be noted that the materials constituting the waveguides 100, 102 and 103, as well as the layer 106 used during the manufacture of the sensor, are those used during the calculation of the indexes $n_{\mathit{eff1}}$ and $n_{\mathit{eff2}}$, in the respective steps 3000 and 3002.

Figure 4:
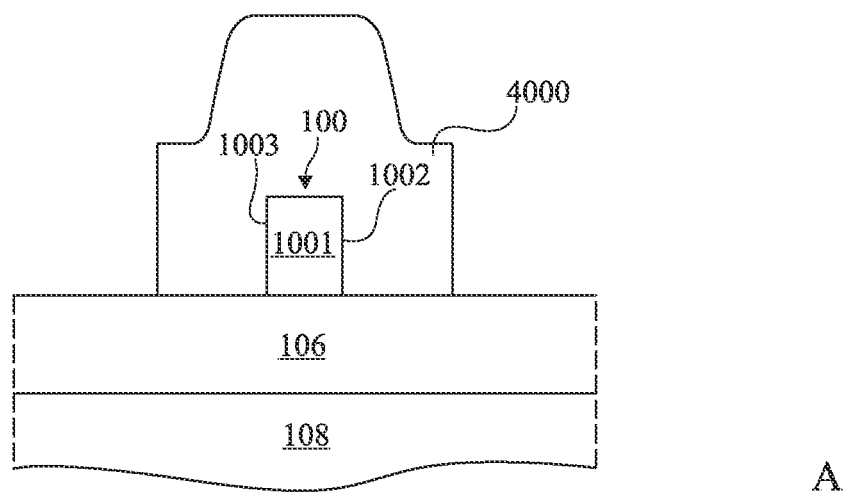
FIG. 4 illustrates schematic sectional views A and B depicting an embodiment of steps for manufacturing a waveguide sensor of the type shown in FIG. 1.
Figure 4:
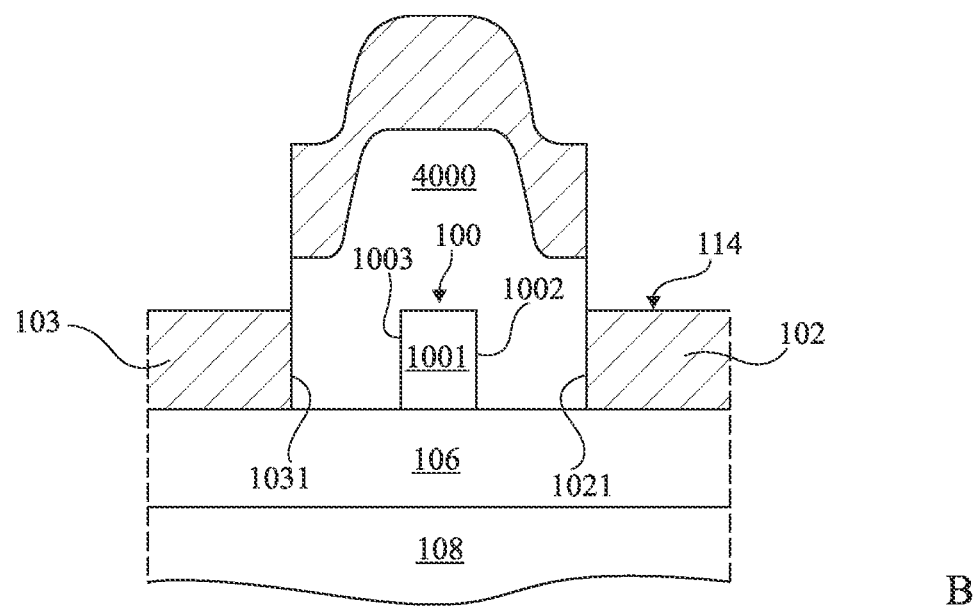

FIG. 4 illustrates schematic sectional views A and B depicting an embodiment of the step 3004 of the method shown in FIG. 3, for a waveguide sensor of the type shown in FIG. 1.

In the step depicted by view A of FIG. 4, the waveguide 100 has been formed on the upper face of the layer 106. For instance, the waveguide 100 is formed by depositing a layer made of the material of the strip 1001, the thickness of which corresponds to the height of the strip 1001, by forming a mask covering a portion of the layer corresponding strip 1001, by removing by etching the parts of the layer not covered by the mask so as to leave the strip 1001 in place, and by removing the mask.

In the step depicted by the view A shown in FIG. 4, a mask 4000, preferably made of a resin, has then been deposited so as to cover the strip 1001 and extend laterally from the faces 1002 and 1003 of the strip up to the site of the future faces 1021 and 1031 of the waveguides 102 and 103. The mask 4000 is deposited in a conformal manner with a thickness greater than the thickness of the future layer 114.

In a following step depicted by the view B shown in FIG. 4, the layer 114 is deposited over the entire structure obtained in the step depicted by view A, in an anisotropic or non-conformal manner, so that the mask 4000 comprises a part exposed, i.e. not covered by the layer 114.

In a following step not illustrated, the mask 4000 is removed, taking with it the portion of the layer 114 that lies on the mask, so that the portions of the layer 114 left in place form the waveguides 102 and 103 and define the cavities 110 and 112. This method is commonly known as lift off. A sensor of the type shown in FIG. 1 is thus obtained.

Figure 5:
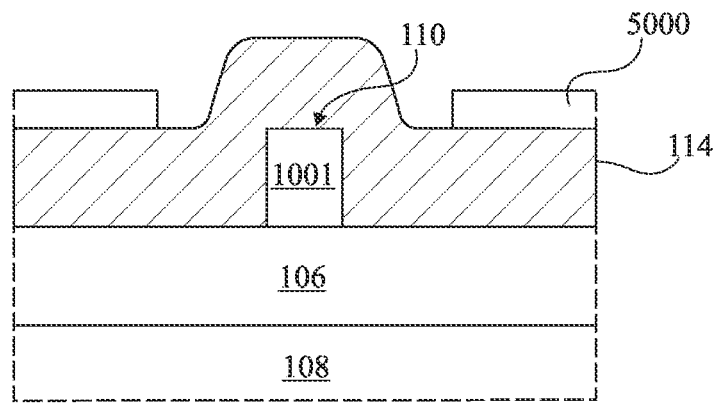
FIG. 5 illustrates schematic sectional views A and B depicting an embodiment of steps for manufacturing a waveguide sensor of the type shown in FIG. 1.
Figure 5:
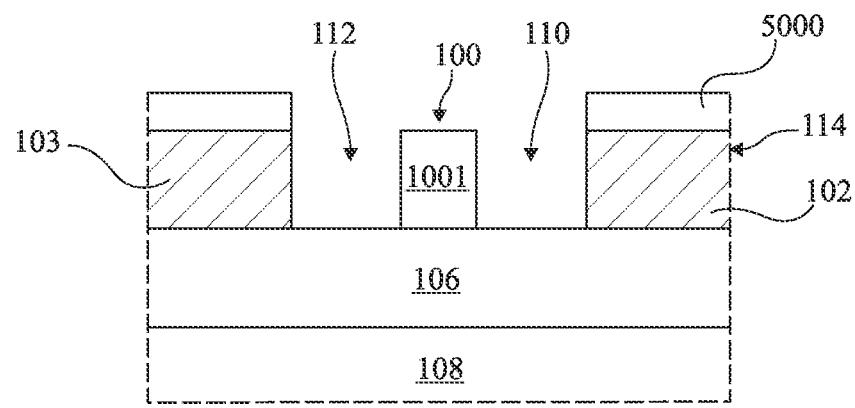

FIG. 5 illustrates schematic sectional views A and B depicting a further embodiment of the step 3004 of the method shown in FIG. 3, for a waveguide sensor of the type shown in FIG. 1.

In a step depicted by view A of FIG. 5, the waveguide 100 has been formed on the upper face of the layer 106, for example in the manner described in relation to view A of FIG. 4. The layer 114 has then been deposited in a conformal manner, with the desired thickness. An etching mask 5000 has thus been formed on the portions of the layer 114 intended to constitute the waveguides 102 and 103.

In a following step depicted by view B of FIG. 5, the portions of the layer 114 not covered by the mask 5000 have been removed by anisotropic etching up to the layer 106. The portions of the layer 114 left in place thus form the waveguides 102 and 103 and define the cavities 110 and 112.

In a following step not depicted, the mask 5000 is removed. A sensor of the type shown in FIG. 1 is thus obtained.

Figure 6:
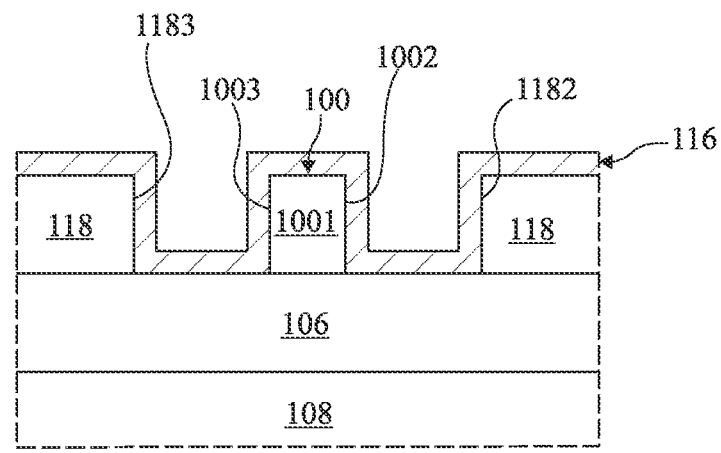
FIG. 6 illustrates schematic sectional views A and B depicting an embodiment of steps for manufacturing a waveguide sensor of the type shown in FIG. 2.
Figure 6:
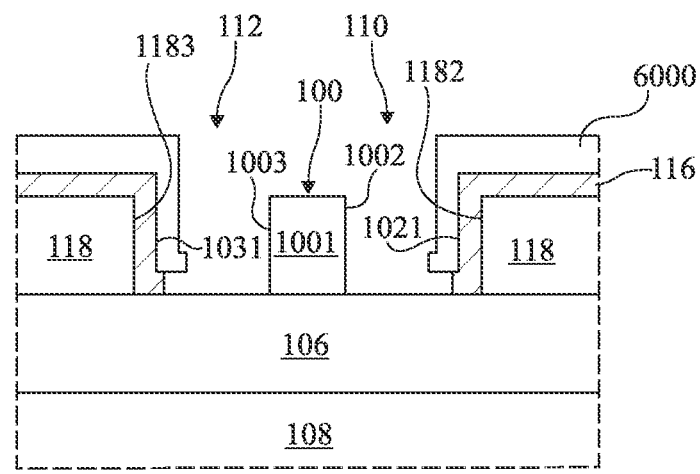

FIG. 6 illustrates schematic sectional views A and B depicting an embodiment of the step 3004 of the method shown in FIG. 3, for a waveguide sensor of the type shown in FIG. 2.

In a step depicted by view A of FIG. 6, the waveguide 100 has been formed on the layer 106, for example in the manner described in relation to FIG. 4. The layer 118 has also been formed, so that the layer 118 comprises the lateral faces 1182 and 1183 parallel to and across from the respective lateral faces 1002 and 1003 of the strip 1001.

According to a first example, the layer 118 is formed by conformal deposition then by removing by etching the portion of the layer 118 disposed between the faces 1182 and 1183.

According to a further example, the layer 118 and the waveguide 100 are made of the same material and formed simultaneously. For example, a layer of this material is deposited in a conformal manner over the entire upper face of the layer 106, with a thickness corresponding to the height of the strip 1001, then the portions of the layer disposed at the sites of the cavities 110 and 112 and of the vertical portions of the layer 116 are removed during steps of masking and etching.

Once the strip 1001 and the layer 118 have been formed, the layer 116 is deposited with the desired thickness, in a conformal manner, over the entire structure.

In a following step depicted by the view B of FIG. 6, a mask 6000 covering the vertical portions of the layer 116 disposed on the faces 1182 and 1183 of the layer 118, and possibly horizontal portions of the layer 116 lying on the upper face of the layer 118 and/or on the upper face of the layer 106, on the side of the faces 1183 and 1182. The exposed portions of the layer 116 were then removed by etching, for example by isotropic etching so as to avoid that portions of the layer 116 are left in place on the bottom of the cavities 110 and 112.

In a following step not depicted, the mask 6000 is removed and a sensor of the type shown in FIG. 2 is obtained.

Figure 7:
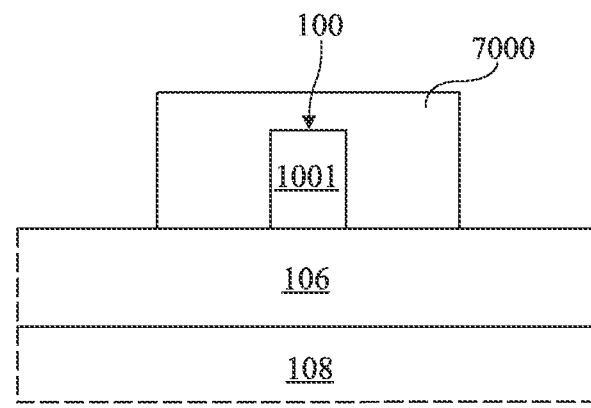
FIG. 7 illustrates schematic sectional views A, B and C depicting an embodiment of steps for manufacturing a waveguide sensor of the type shown in FIG. 2.
Figure 7:
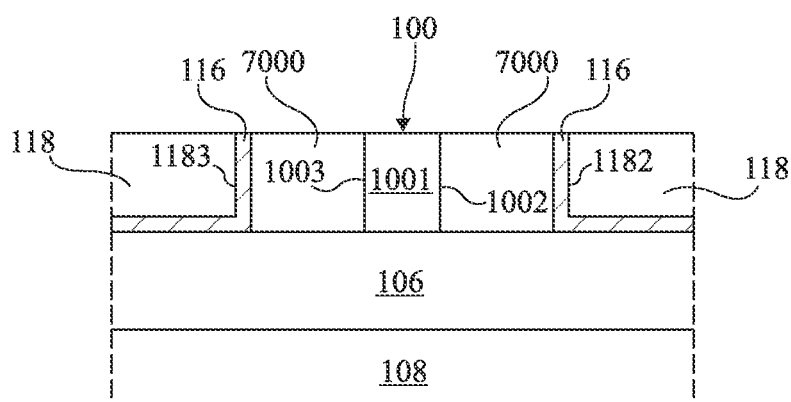
Figure 7:
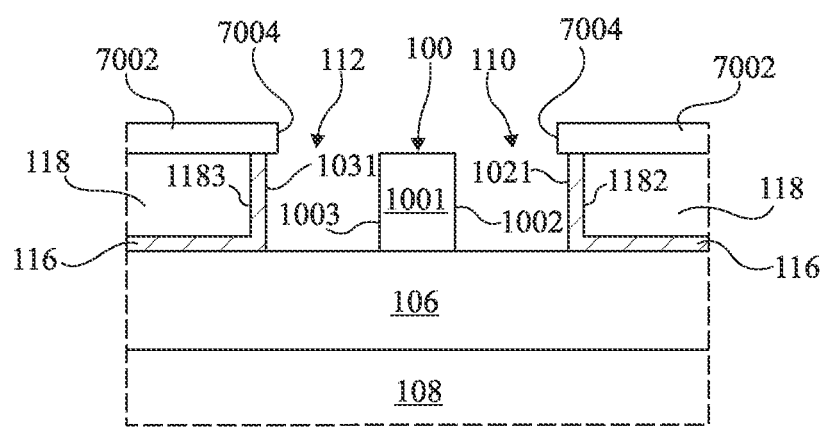

FIG. 7 illustrates schematic sectional views A, B and C depicting a further embodiment of the step 3004 of the method shown in FIG. 3, for a waveguide sensor of the type shown in FIG. 2.

In a step depicted by view A of FIG. 7, the waveguide 100 has been formed on the layer 106, for example in the manner described in relation to FIG. 4. A layer 7000 made of a material selectively etchable with respect to the material of the strip 1001, for example a layer 7000 of silicon oxide when the strip 1001 is made of silicon nitride, was then deposited over the entire structure. The thickness of the layer 7000 is greater than or equal to, preferably greater than, the height of the strip 1001, so that the level of the upper face of the layer 7000 is above the level of the upper face of the strip 1001. Preferably, the layer 7000 is formed so that its upper face is substantially flat, for example by providing a step of polishing or chemical mechanical planarisation (CMP) after the layer 7000 has been deposited in a conformal manner. The layer 7000 was then etched up to the layer 106, while leaving in place a portion of the layer 7000 covering the strip 1001 and extending laterally on either side of the strip 1001, up to the future sites of the respective faces 1021 and 1031.

In a subsequent step depicted by view B of FIG. 7, the layer 116 has been deposited over the entire structure obtained after the steps described in relation to view A of FIG. 7, preferably in a manner in accordance with the desired thickness. A layer 118, for example of silicon oxide, was then deposited in such a way that its upper face is substantially flat and at a level equal to the upper level of the layer 7000. For instance, the layer 118 is formed by deposition of hydrogen silesquixane (HSQ). A step of planarisation, for example by CMP, is then performed up to a level greater than or equal to that of the upper face of the strip 1001, so as to remove the horizontal portions of the layer 118 lying on the layer 7000. The vertical portions of the layer 116 left in place cover the vertical faces 1182 and 1183 of the layer 118.

In a subsequent step depicted by view C of FIG. 7, a mask 7002 was formed on the structure obtained after the implementation of the steps described in relation to view B of FIG. 7. An opening 7004 is provided in the mask 7002, facing the portions of the layer 7000 (not present in view C, see view B) extending laterally from the face 1002, respectively 1003, of the strip 1001 up to the face 1021, respectively 1031, of the layer 116, and of the possible portion of the layer 7000 lying on the upper face of the strip 1001. In particular, the mask 7002 covers the top of the vertical portions of the layer 116 that cover the faces 1182 and 1183 of the layer 118. Preferably, the mask 7002 extends onto the portions of the layer 7000 extending laterally from the face 1002, respectively 1103, of the strip 1001 up to the face 1021, respectively 1031, of the layer 116.

The portions of the layer 7000 not entirely covered by the mask 7002 are then removed by etching. The space left free by the removal of these portions of the layer 7000 form the cavities 110 and 112.

In a following step not depicted, the mask 7002 is removed. A sensor of the type shown in FIG. 2 is thus obtained.

Figure 8:
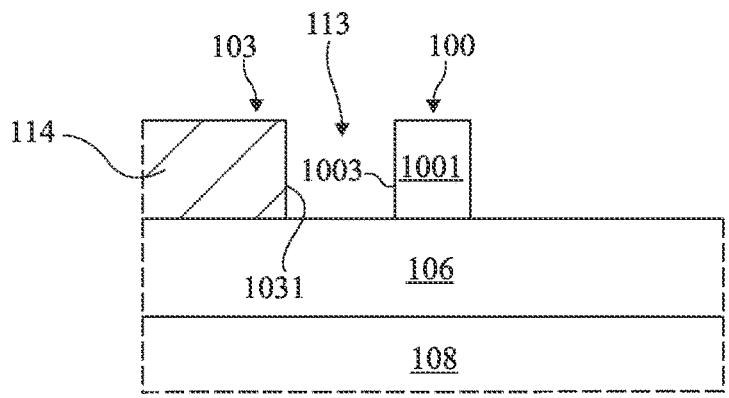
FIG. 8 illustrates a sectional view of a variant embodiment of a sensor of the type shown in FIG. 1.

FIG. 8 illustrates a sectional view of a variant embodiment of a sensor of the type shown in FIG. 1.

In this variant embodiment, the hybrid waveguide of the sensor only comprises a sole plasmonic guide, here the plasmonic guide 103. In other words, the plasmonic guide 102 has been omitted. In this example, the remaining plasmonic waveguide 103 is of the type described in relation to FIG. 1 (thick layer 114). This variant embodiment also applies to the case where the remaining plasmonic waveguide is of the type described in relation to FIG. 2 (thick layer 112).

Those skilled in the art are capable of adapting the methods described in relation to FIGS. 3 to 8 to this variant embodiment. In particular, those skilled in the art are capable of determining the width of the cavity separating the waveguide wo from the remaining plasmonic waveguide 102 or 103, for example by implementing the step 3002 of the method shown in FIG. 3 with a sensor, the hybrid waveguide of which only comprises one plasmonic waveguide 102 or 103.

Figure 9:
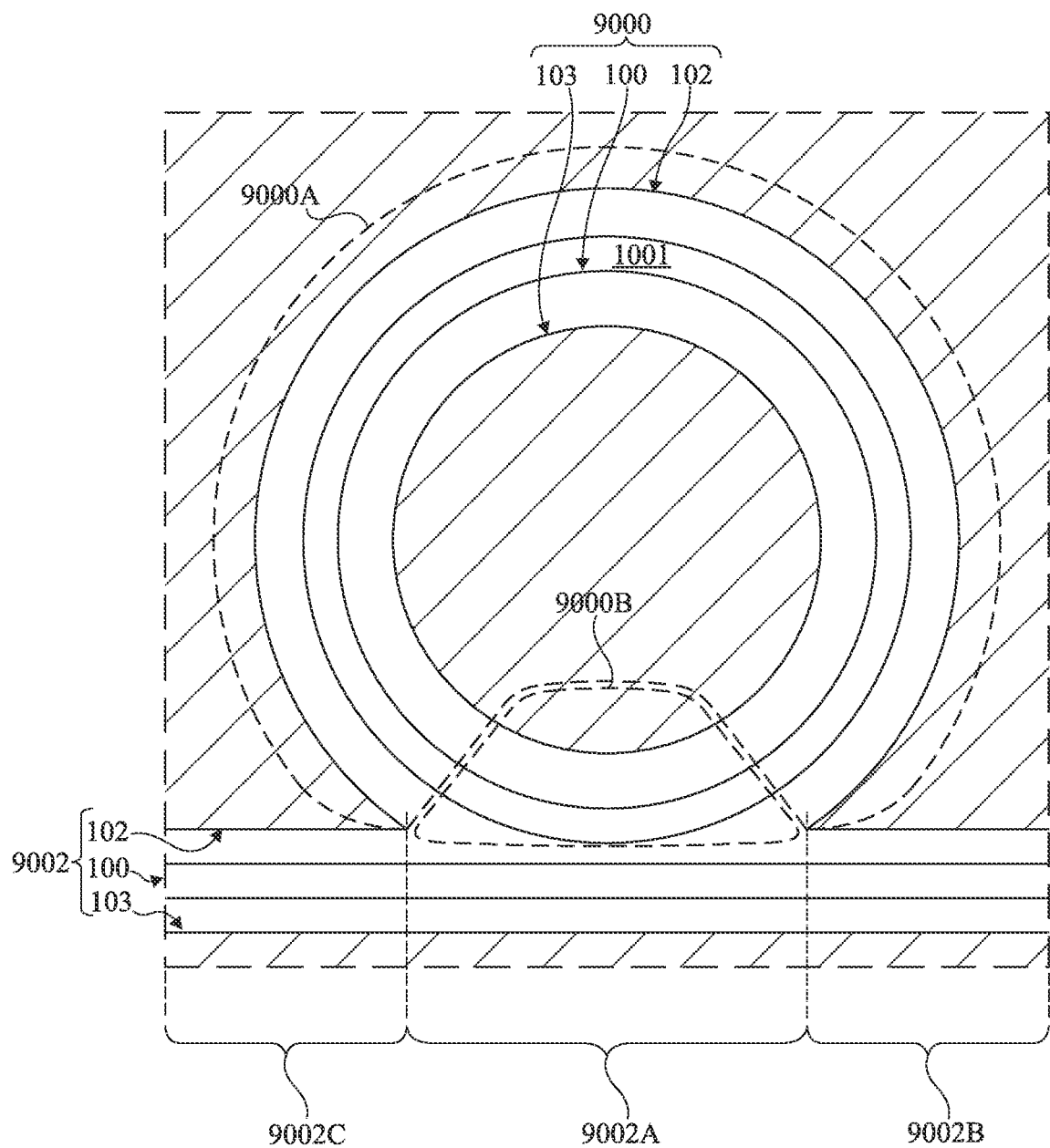
FIG. 9 illustrates a schematic top view of a further embodiment of a waveguide sensor.

FIG. 9 illustrates a schematic top view of a further embodiment of a waveguide sensor.

The sensor comprises a first hybrid waveguide 9000 a first portion 9000A of which (delimited by dotted lines in FIG. 9) comprises a waveguide wo coupled to two plasmonic waveguides 102 and 103 as described in relation to FIG. 1 or 2, and a second portion 9000B of which (delimited by dotted lines in FIG. 9) comprises the waveguide wo coupled to the sole waveguide 103, as described in relation to FIG. 8. The strip 1001 of the waveguide 9000 here forms a loop, for example circular in form when viewed from above, so as to constitute a resonant ring.

The sensor further comprises a second waveguide, here a hybrid waveguide 9002, for example rectilinear. The waveguide 9002 comprises a portion 9002A (delimited by dotted lines in FIG. 9) comprising a waveguide 100 coupled to a sole plasmonic waveguide 103, as described in relation to FIG. 8. The waveguide 9002 further comprises a portion 9002B disposed upstream from the portion 9002A and a portion 9002C disposed downstream from the portion 9002A, i.e. respectively right and left of the portion 9002A in the example shown in FIG. 9 where the optical signal is provided at the end of the guide 9002, which is on the right in FIG. 9.

The waveguide 100 of the portion 9002A of the hybrid guide 9002 is optically coupled with the waveguide 100 of the portion 9000B of the hybrid guide 9000, here by evanescent-wave coupling.

As a variant, the waveguide 9002 can be an optical waveguide, for example a strip waveguide similar to the waveguide 100, but in which the optical mode of interest is propagated in a confined manner, or, in other words, in a guided manner. A portion of this optical guide is thus coupled to the waveguide 100 of the portion 9000B of the hybrid guide 9000.

During operation, a dielectric fluid possibly comprising a molecule or a particle to be detected covers the sensor. An adapted optical signal is provided to the waveguide 100 of the portion 9002B of the hybrid guide 9002. The waveguide 9000 is configured to resonate at the wavelength of the optical signal.

In the absence of a molecule or particle to be detected in the cavities 110 and 112 (not referenced in FIG. 9) of the hybrid waveguide 9000, there is resonance and the optical power of the signal available at the end of the portion 9002C opposite the portion 9002A is substantially zero.

Conversely, when one or more molecules or particles to be detected are located in the cavities 110 and 112 of the hybrid guide 9000, this modifies the effective optical index of the optical mode propagated in the hybrid guide 9000. As a result, the waveguide 9000 no longer resonates at the wavelength of the optical signal. This is detected by the fact that the optical power of the signal available at the end of the portion 9002C opposite the portion 9002A is non-zero. More specifically, this power increases when the resonance wavelength of the waveguide 9000 moves away from the wavelength of the optical signal. As described in the foregoing in relation to FIG. 1, when the relation between the variation in the power available at the end of the portion 9002C opposite the portion 9002A and the concentration of the molecule or of the particle to be detected in the dielectric fluid are known, for example following a step of calibrating the sensor, it is possible to determine, based on a measurement of this power, the concentration of this molecule or particle in the dielectric fluid. Preferably, this is in an operating range of the sensor in which the optical power of the signal available at the end of the portion 9002C opposite the portion 9002A varies in a linear manner with the variation in the effective optical index of the optical mode propagated in the sensor.

For instance, in a sensor of the type shown in FIG. 9, the inventors measured that a variation of a unit in the optical index (or refractive index) of the dielectric fluid (liquid or gas) in which it is desired to detect a particle or a molecule causes a shift of 698 nm in the resonance wavelength of the waveguide 9000.

The hybrid waveguides of the sensor shown in FIG. 9 can be of the same type as any of the hybrid waveguides described in relation to FIGS. 1 to 8.

Furthermore, although a sensor has been described here that uses the resonance of an annular hybrid waveguide for detecting a molecule, those skilled in the art are capable of providing other sensor embodiments. For example, those skilled in the art are capable of designing a sensor using the operative principle of a Mach-Zehnder interferometer, for example an interferometer in which the two branches of the interferometer are realised based on a hybrid waveguide as described in the foregoing.

A hybrid waveguide comprising a dielectric optical waveguide and one or two plasmonic waveguides have been described up to this point. An optical supermode can be guided in hybrid waveguides of other types.

In a variant embodiment of a hybrid waveguide sensor, a hybrid waveguide is provided that is constituted by an optical waveguide 100 as described in the foregoing, coupled to one or two surface waveguides 102, 103 that are not plasmonic. In other words, it is provided that the surfaces 1021 and 1031 are not metal surfaces but surfaces configured in order that a guided surface mode other than a plasmonic mode is propagated there. What is called a surface mode here is a mode that is guided solely at the interface between two materials, corresponding here to the surfaces 1021 and 1031, the power of this mode on each side of the interface decreasing in an exponential manner. Thus, in a similar manner to what has been described in the foregoing, a radiated optical mode of the optical guide 100 that reaches the surface 1021 or 1031 causes a guided surface mode to be created, i.e. to be excited, and propagated on this surface. The coupling between the radiated mode and the guided surface mode thus results in a supermode. The dimensions of such a hybrid waveguide are determined by adapting the method of FIG. 3 so that the supermode is guided in the hybrid waveguide.

Such an optical/surface hybrid waveguide benefits from the same advantages as an optical/plasmonic hybrid waveguide, with the exception of the advantages linked to the presence of a metal surface in the hybrid waveguide.

Figure 10:
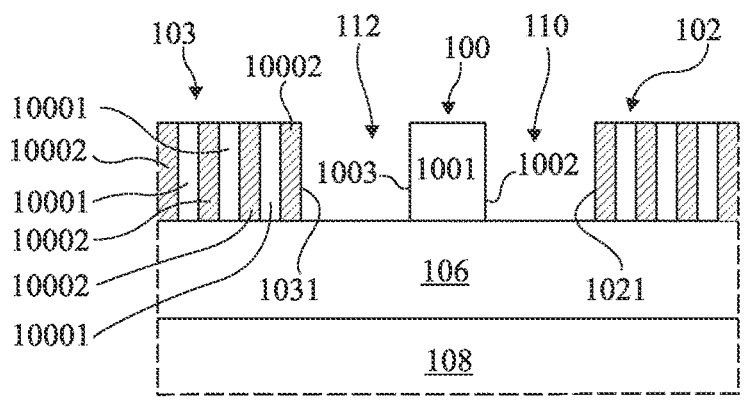
FIG. 10 illustrates schematic views A and B, respectively a sectional view and a top view, of a further variant embodiment of a sensor of the type shown in FIGS. 1, 2 and 8.
Figure 10:
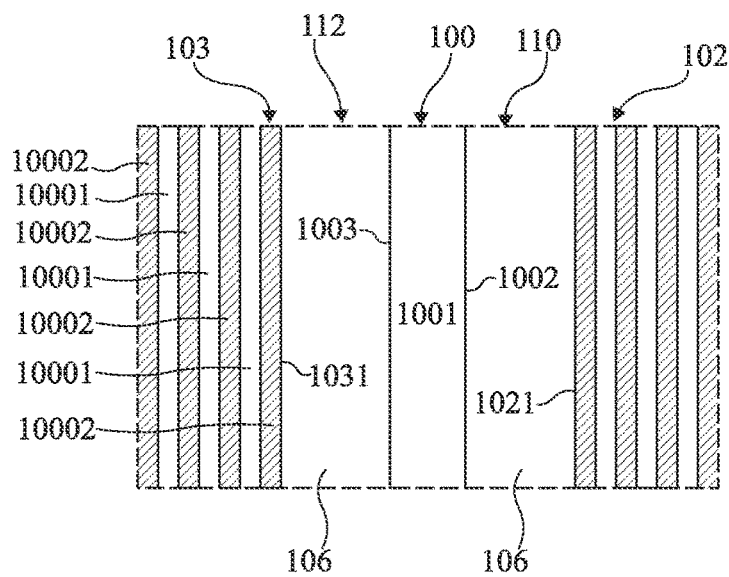

FIG. 10 illustrates schematic views A and B, respectively a sectional view and a top view, of a such a variant embodiment of a sensor of the type shown in FIGS. 1, 2 and 8.

In this variant embodiment, the one or more waveguides 102, 103 coupled to the waveguide 100 for forming a hybrid waveguide of the sensor are not plasmonic waveguides, but have a plasmonic behaviour. In other words, although the surfaces 1021 and 1031 are not metal, surface modes can be guided there. In this example, the waveguides 102 and 103 are realised from a structure of the Bragg grating type a face of which constitutes the face 1021, respectively 1031, of the respective waveguides 102 and 103.

More specifically, each waveguide 103 and 102 comprises here, in a direction orthogonal to the faces 1021 and 1031, an alternation of layers 10001 and 10002, for example respectively made of silicon and of silicon nitride. For instance, the thickness of the layers 10001 is comprised between 300 and 600 nm, preferably equal to $\lambda/(4.n1)$ with n1 the refractive index of the material of the layers 10001 and $\lambda$ the wavelength of the optical signal provided to the optical waveguide 100. The thickness of the layers 10002 is, for example, comprised between 300 and 600 nm preferably equal to $\lambda/(4.n2)$ with n2 the refractive index of the material of the layers 10002.

More generally, those skilled in the art are capable of determining the materials of the layers 10001 and 10002 and/or the thickness of these layers, so that a guided surface mode can be propagated by the faces 1021 and 1031 of the waveguides 102 and 103.

The variant embodiment described in relation to FIG. 8 applies to the hybrid waveguide of the sensor shown in FIG. 10.

Those skilled in the art are capable of adapting the method described in relation to FIG. 3 to the case of a hybrid waveguide as described in relation to FIG. 10, comprising one or two Bragg grating waveguides 102, 103.

Moreover, the hybrid waveguide shown in FIG. 10 comprising a sole or both Bragg grating surface waveguides 102 and 103, can be used for implementing the sensor described in relation to FIG. 9.

Figure 11:
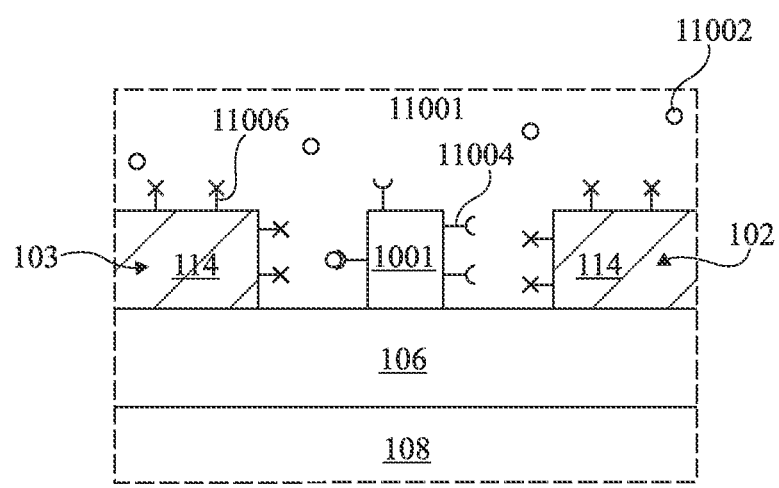
FIG. 11 illustrates a sectional view of the sensor shown in FIG. 1, according to a variant embodiment.

FIG. 11 illustrates a sectional view of the sensor shown in FIG. 1, according to a variant embodiment. In FIG. 11, a dielectric fluid 11001, for example water, covers the sensor, the fluid comprising molecules or particles 11002 to be detected.

In this variant, the surface of the strip 1001 intended to be in contact with the fluid 11001, i.e. the surface of the strip 1001 that is in contact with the fluid 11001 in FIG. 11, has been functionalised by molecules 11004 one end of which binds to the material of the strip 1001, and the other end of which is configured to bind with a molecule or a particle 11002. This makes it possible to increase the probability that a molecule or a particle 11002 present in the fluid 11001 is detected by the sensor.

In this variant, optionally, the surface of the metal layer 114 is also functionalised as illustrated in FIG. 11. More specifically, in this example, the surface of the layer 114 intended to be in contact with the fluid 11001, i.e. the surface of the layer 114 that is in contact with the fluid 11001 in FIG. 11, is functionalised by molecules 11006 one end of which binds to the material of the layer 114, and the other end of which is configured to repel the molecules or the particles 11002. This prevents molecules or particles 11002 to be detected from bonding or being deposited on the layer 114. This increases the probability that a molecule or a particle 11002 is rather deposited in the vicinity of the strip 1001, and thus the probability that this molecule or this particle is detected by the sensor.

In a variant not depicted, it is possible to provide that only the layer 114 is functionalised.

Moreover, those skilled in the art are capable of functionalising the surface of the strip 1001, and/or the surface of the layer 116 of a sensor of the type shown in FIG. 2. Those skilled in the art are also capable of providing such a functionalisation in a sensor of the type shown in FIG. 9.

Although it has not been indicated above, the size of the particles, for example of the microparticles or of the nanoparticles, or of the molecules that it is desired to detect with the described hybrid waveguides and sensors is for example less than 5 µm, for example comprised between 0.1 µm and 2 µm, it being understood that the size of a particle or of a molecule here designates its largest dimension.

Various embodiments and variants have been described. Those skilled in the art will understand that certain features of these embodiments can be combined and other variants will readily occur to those skilled in the art. In particular, although embodiments have been described here in which the dielectric fluid is a liquid, this fluid can be a gas. For instance, the dielectric liquid is water or a phosphate buffered saline (PBS) solution. For instance, the dielectric gas is the ambient air, in which it is desired, for example, to detect microparticles such as benzene or hydrocarbons. The present disclosure is, of course, not limited to these examples of dielectric fluids.

Furthermore, those skilled in the art are capable of adapting the dimensions and/or the materials of the hybrid waveguides described in the foregoing as a function of the wavelength of the optical signal provided to the hybrid guide, i.e. as a function of the operating wavelength of the corresponding sensor, and/or as a function of the optical mode in question. Finally, the practical implementation of the embodiments and variants described herein is within the capabilities of those skilled in the art based on the functional description provided hereinabove. In particular, those skilled in the art are capable of providing variant embodiments of the step 3004 described in relation to FIGS. 3 to 7.

What is claimed is:

1. A sensor comprising:
   a hybrid waveguide comprising:
   a first dielectric optical waveguide lying on and in contact with a dielectric support layer;
   a first surface waveguide optically coupled to the first dielectric optical waveguide, parallel to the first dielectric optical waveguide, and lying on the dielectric support layer, the first surface waveguide comprising a lateral surface configured to guide a surface mode, the first surface waveguide comprising a metal layer and a substrate layer made of a different material than the metal layer, the metal layer covering the substrate layer and comprising the lateral surface; and
   a cavity intended to be filled with a dielectric fluid, separating laterally the first dielectric optical waveguide from the lateral surface of the first surface waveguide.

2. The sensor according to claim 1, wherein the first surface waveguide is a plasmonic waveguide and being configured to propagate surface plasmons.

3. The sensor according to claim 1, wherein the hybrid waveguide is configured to guide an optical mode of an optical signal when the dielectric fluid fills the cavity, and covers the first dielectric optical waveguide and the first surface waveguide.

4. The sensor according to claim 3, wherein an effective optical index of the optical mode in the hybrid waveguide is higher than an refractive index of the dielectric fluid and than an effective optical index of the optical mode in the first dielectric optical waveguide on its own.

5. The sensor according to claim 3, wherein the optical mode is a radiated mode of the first dielectric optical waveguide predominantly from longitudinal lateral faces of the first dielectric optical waveguide.

6. The sensor according to claim 1, wherein the first dielectric optical waveguide comprises a dielectric or semi-conducting strip a lower face of which lies on and in contact with an upper face of the support layer and longitudinal lateral faces of which constitute the longitudinal lateral faces of the first dielectric optical waveguide.

7. The sensor according to claim 1, wherein a dimension of the cavity between the longitudinal lateral face of the first dielectric optical waveguide and the lateral surface of the first surface waveguide is less than an operating wavelength of the sensor.

8. The sensor according to claim 7, wherein the cavity extends widthways from the longitudinal lateral face of the first dielectric optical waveguide up to the lateral surface of the first surface waveguide, the lateral surface of the first surface waveguide being parallel to the longitudinal lateral face.

9. The sensor according to claim 1, comprising an annular resonant waveguide constituted entirely or partly by the hybrid waveguide.

10. The sensor according to claim 1, comprising an interferometer of a Mach-Zehnder type constituted entirely or partly by the hybrid waveguide.

11. The sensor according to claim 1, wherein faces of the first dielectric optical waveguide intended to be in contact with the dielectric fluid or faces of the first surface waveguide intended to be in contact with the fluid are functionalized as a function of a molecule or a particle to be detected in the fluid.

12. The sensor according to claim 1, adapted to detect, in the fluid, a molecule or a particle of a size of up to 5 μm.

13. A method comprising:
    determining, by simulation of a hybrid waveguide of a sensor comprising a dielectric optical waveguide lying on a dielectric support layer and being surrounded by a dielectric fluid, dimensions of a transverse section of a first dielectric optical waveguide, the simulation of the sensor being performed without accounting for any surface waveguide, the dimensions being determined such that, for an optical mode of a signal propagating in the first dielectric optical waveguide, an effective optical index of the optical mode is lower than an refractive index of the dielectric fluid;
    determining, by simulation of the sensor in which the transverse section of the first dielectric optical waveguide has the determined dimensions, a position of a first surface waveguide with respect to the first dielectric optical waveguide so that an effective optical index of the optical mode in the hybrid waveguide is greater than the refractive index of the dielectric fluid; and
    manufacturing the sensor with the determined dimensions and the determined position, wherein the sensor comprises a hybrid waveguide comprising:
    a first dielectric optical waveguide lying on and in contact with a dielectric support layer;
    a first surface waveguide optically coupled to the first dielectric optical waveguide, parallel to the first dielectric optical waveguide, and lying on the dielectric support layer, the first surface waveguide comprising a lateral surface configured to guide a surface mode, the first surface waveguide comprising a metal layer and a substrate layer made of a different material than the metal layer, the metal layer covering the substrate layer and comprising the lateral surface; and
    a cavity intended to be filled with a dielectric fluid, separating laterally the first dielectric optical waveguide from the lateral surface of the first surface waveguide.

14. The method according to claim 13, wherein the first surface waveguide is a plasmonic waveguide, the lateral surface of the first surface waveguide being of metal and being configured to propagate surface plasmons.

15. The method according to claim 13, further comprising guiding an optical mode of an optical signal when the dielectric fluid covers the first dielectric optical waveguide and the first surface waveguide.

16. The method according to claim 13, wherein the first dielectric optical waveguide comprises a dielectric or semi-conducting strip a lower face of which lies on and in contact with an upper face of the support layer and longitudinal lateral faces of which constitute the longitudinal lateral faces of the first dielectric optical waveguide.

17. A method of forming a sensor comprising a hybrid waveguide, the method comprising:
    forming an optical waveguide disposed over a dielectric support layer;
    forming a first plasmonic waveguide and a second plasmonic waveguide disposed over the dielectric support layer, the first plasmonic waveguide being oriented along a first lateral surface of the optical waveguide, the second plasmonic waveguide being oriented along a second lateral surface of the optical waveguide, the first plasmonic waveguide comprising a first material and a second material made of a different material than the first material, the first material covering a sidewall of the second material facing the optical waveguide, the first material forming a lateral surface of the first plasmonic waveguide; and forming a first cavity disposed between the first plasmonic waveguide and the optical waveguide and a second cavity disposed between the second plasmonic waveguide and the optical waveguide, the first cavity being configured to be filled with a dielectric fluid and the second cavity being configured to be filled with the dielectric fluid.

18. The method according to claim 17,
wherein forming the first plasmonic waveguide and the second plasmonic waveguide and forming the first cavity and the second cavity comprises:
conformally depositing a metal layer over the optical waveguide,
forming an etch mask over the metal layer, and
removing portions of the metal layer not covered with the etch mask to form the first plasmonic waveguide and the second plasmonic waveguide along with the first cavity and the second cavity.

19. The method according to claim 17,
wherein forming the optical waveguide, forming the first plasmonic waveguide and the second plasmonic waveguide, and forming the first cavity and the second cavity comprises:
forming a first feature corresponding to the optical waveguide, a second feature corresponding to the first plasmonic waveguide, and a third feature corresponding to the second plasmonic waveguide over the dielectric support layer;
forming a conformal liner over the first, the second, and the third features;
forming a etch mask covering the conformal liner, the etch mask covering portions of the conformal liner over the second and third features; and
removing the portions of the conformal liner exposed by the etch mask.

20. A method of forming a sensor comprising a hybrid waveguide, the method comprising:
forming an optical waveguide disposed over a dielectric support layer;
forming a first plasmonic waveguide and a second plasmonic waveguide disposed over the dielectric support layer, the first plasmonic waveguide being oriented along a first lateral surface of the optical waveguide, the second plasmonic waveguide being oriented along a second lateral surface of the optical waveguide; and
forming a first cavity disposed between the first plasmonic waveguide and the optical waveguide and a second cavity disposed between the second plasmonic waveguide and the optical waveguide, the first cavity being configured to be filled with a dielectric fluid and the second cavity being configured to be filled with the dielectric fluid, wherein forming the optical waveguide, forming the first plasmonic waveguide and forming the first cavity comprises:
forming a first feature corresponding to the optical waveguide over the dielectric support layer;
forming a pattern comprising a first material selectively etchable with respect to the first feature, the first material covering sidewalls and top surface of the first feature;
forming a conformal liner over the pattern and exposed surfaces of the dielectric support layer;
forming a second material over the conformal liner;
using a planarizing process, opening a top surface of the first feature and forming a second feature comprising a portion of the second material and the conformal liner;
forming an etch mask over the second feature;
performing an etching process to remove the pattern exposed after forming the etch mask; and
removing remaining etch mask to form the first cavity and the first plasmonic waveguide from the second feature.

* * * * *

UNITED STATES PATENT AND TRADEMARK OFFICE
CERTIFICATE OF CORRECTION

| | | |
|---|---|---|
| PATENT NO. | : 12,038,605 B2 | Page 1 of 1 |
| APPLICATION NO. | : 17/513575 | |
| DATED | : July 16, 2024 | |
| INVENTOR(S) | : Calvo et al. | |

It is certified that error appears in the above-identified patent and that said Letters Patent is hereby corrected as shown below:

On the Title Page

Item (72), in Column 1, in "Inventors", Line 1, delete "Lyons" and insert -- Lyon --.

Signed and Sealed this
Twenty-fourth Day of September, 2024

*Katherine Kelly Vidal*

Katherine Kelly Vidal
*Director of the United States Patent and Trademark Office*